Feb. 26, 1952
P. E. CATE
2,586,915
MECHANISM FOR OPERATING A SEALING COLLET
Filed Sept. 24, 1947
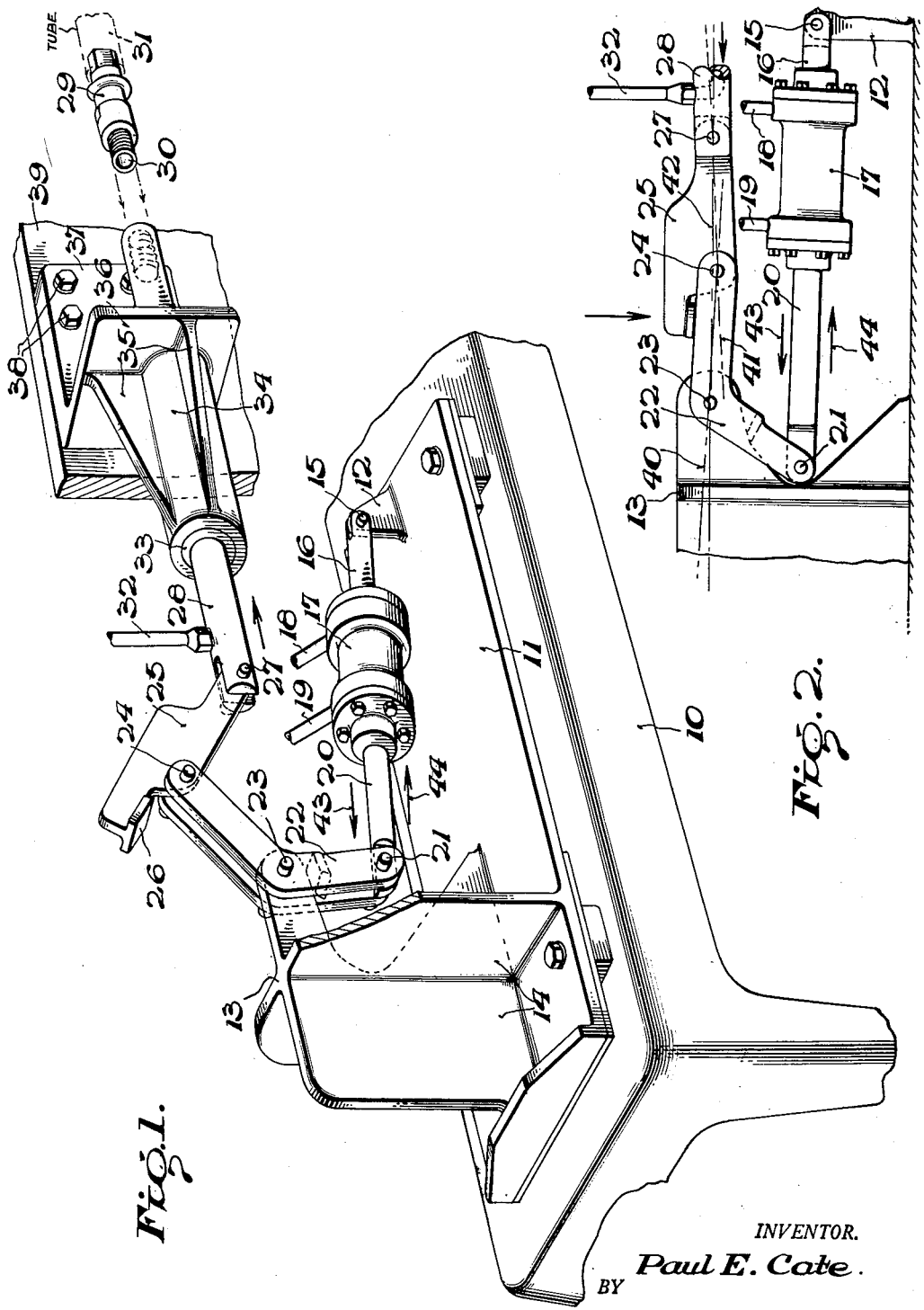
INVENTOR.
*Paul E. Cate.*
BY
*Cameron, Kerkam + Sutton*
Attorneys Patented Feb. 26, 1952

2,586,915

UNITED STATES PATENT OFFICE 2,586,915

MECHANISM FOR OPERATING A SEALING COLLET

Paul E. Cate, Knoxville, Tenn., assignor to Robertshaw-Fulton Controls Company, Knoxville, Tenn., a corporation of Delaware Application September 24, 1947, Serial No. 775,927

5 Claims. (Cl. 153—73)

This invention relates to mechanism for moving a sealing collet into and out of its operative position.

In apparatus for moving a sealing collet into and out of its operative position with respect to the element to be sealed, as by way of illustration a sealing collet moved into sealing relationship with the open end of a tube to be corrugated by hydrostatic pressure such as occurs for example in the formation of bellows hydraulically, it has been the practice to mount the collet on or in direct connection with the piston rod of a hydraulic device which must be of sufficient size so that the pressure developed therein is adequate, after the collet has been moved into operative position, to overcome any back pressure acting on the collet, such as the hydraulic pressure utilized interiorly of the tube for effecting the corrugating operation. The operation of such a hydraulic device is necessarily slow owing to its size, the length of its stroke, and the magnitude of the pressure under which it must operate if it is also to be capable of overcoming the back pressure so developed on the collet.

It is an object of this invention to provide an improved collet operating mechanism which does not have to operate under a pressure sufficient to overcome the back pressure acting on the collet.

Another object of this invention is to provide an improved device of the type characterized which may operate at a materially higher speed than where the collet is directly connected to the piston rod of a hydraulic device so as to cut down on the time required to move the collet into and out of its operative position.

Another object of this invention is to provide an improved device of the type characterized wherein the collet may be moved into and out of its operative position by a stroke of a fluid pressure operated device that is shorter than the required movement of the collet.

Another object of this invention is to provide an improved device of the type characterized which is of materially smaller size than required where the collet is directly connected to the piston rod of a hydraulic device.

Another object of this invention is to provide an improved device of the type characterized which is of materially lighter construction than collet operating mechanism heretofore used and composed of parts that are inexpensive to fabricate and assemble.

Another object of this invention is to provide an improved device of the type characterized wherein the rectilinear movement of the collet into and out of its operative position is so guided as to assure accurate alignment of the collet with the element to be engaged.

Other objects will appear as the description of the invention proceeds.

The invention is capable of receiving a variety of mechanical expressions only one of which has been illustrated on the accompanying drawing; therefore, it is to be expressly understood that the drawing is for purposes of illustration only, and is not to be construed as a definition of the limits of the invention, reference being had to the appended claims for that purpose.

Referring in detail to the accompanying drawing,

Fig. 1 is a perspective elevation, somewhat diagrammatic, to illustrate an embodiment of the present invention; and Fig. 2 is a fragmentary side view of certain portion of the collet operating mechanism of Fig. 1 but in a different position.

In the form shown, the frame 10 of the machine has mounted thereon in any suitable way a base plate 11 having secured thereto, or integrally formed thereon, an upstanding lug 12 and a rigid bracket 13 of any suitable construction but here illustrated as composed of right angularly extending plate-like sections 14 to afford the desired rigidity. Pivotally mounted on lug 12, as by a pin 15, is a rod 16 to which is secured in any suitable way a cylinder 17 of a fluid pressure device having suitable fluid connections 18 and 19 through which fluid pressure, as hydraulic pressure, may be introduced into and withdrawn from the cylinder 17. Mounted in said cylinder is any suitable pressure operated piston having a piston rod 20 extending exteriorly of the cylinder 17 and pivotally connected at 21 to a lever 22, here shown as a bell crank, that is pivotally mounted on the bracket 13 at 23. The opposite end of said lever 22 is pivotally connected at 24 to a second lever 25 which at its adjacent end extends beyond the pivot 24 where it is provided, integrally therewith or suitably attached thereto, with a transversely extending bumper member 26 for a purpose to be explained.

The opposite end of lever 25 is pivotally connected at 27 to a spindle 28 on which is mounted, at its opposite end, a collet 29 of any suitable construction. As is common practice, spindle 28 is shown as provided with an internal passage 30 through which fluid under pressure may be introduced through the collet into the tube 31 or other element with which the collet is to cooperate, and to this end the spindle 28 has connected thereto a suitable conduit 32 through which said fluid may be introduced into the passage 30. To guide said spindle 28 and assure accurate alignment of the collet with the tube or other element 31, said spindle is mounted in an elongated guide sleeve 33 which in turn is suitably mounted in an elongated tubular bracket 34 reenforced by ribs 35 and carried by a plate 36 having a right angularly extending portion 37 by which it may be suitably attached, as by bolts or screws 38, to any suitable upstanding portion 39 of the frame.

As shown more particularly in Fig. 2, bumper member 26 is so disposed that it will engage the upper face of bell crank lever 22 and prevent further movement of the pivot 24 downwardly as viewed in the drawing, as soon as pivot 24 has passed slightly beyond its dead center position so that the lines connecting pivots 23 and 24 and pivots 24 and 27, and respectively designated 40 and 41, intersect at a flat obtuse angle below the line 42 connecting the pivots 23 and 27.

When the collet 29 is to be moved into operative position, the parts of the operating mechanism are in the relationship shown in Fig. 1. Fluid pressure having been admitted to the cylinder 17 through conduit 18, piston rod 20 is moved to the left as viewed in the drawing as indicated by the arrow 43. Movement of piston rod 20 from the position shown in Fig. 1 to the position shown in Fig. 2 moves the bell crank 22 around its pivot 23 from the position shown in Fig. 1 to the position shown in Fig. 2, cylinder 17 pivoting around its axis 15 to the extent required. Owing to the multiplication factor introduced by the levers 22 and 25, spindle 28 is moved to the right as viewed in Fig. 1 by an amount predeterminately larger than the movement of the piston rod 20, depending upon the relationship of the involved lever arms, so as to move the spindle 28 by the desired amount to engage its collet 29 with the tube or other element 31. Thereby a relatively short stroke of the piston rod 20 may be multiplied to the desired extent to produce the desired displacement of the collet 29.

Levers 22 and 25 which have the relationship of a toggle are thereby moved until the bumper member 26 engages the upper face of lever 22, in which position the arms of the toggle are approximately in alignment, and further pivotal movement of said levers is prevented, but pivot 24 has passed slightly beyond its dead center position as shown in Fig. 2 so as to lock said levers against displacement under the action of any back pressure acting on the collet. By making the aforesaid levers and bumper member adequately strong and rigid they will thus resist any displacement of the collet toward the left as viewed in Fig. 1 under whatever back pressure exists on the collet even though the pressure applied in the cylinder 17 to move the collet to operative position may be relatively light as compared to the back pressure acting on the collet. When the collet is to be withdrawn from operative position fluid pressure is admitted to the cylinder 17 through conduit 19, pressure being released through conduit 18, whereby the piston rod 20 is moved in the direction of the arrow 44, and lever 22 breaks the lock at pivot 24, moving the levers 22 and 25 into the angular relationship shown in Fig. 1 and withdrawing the spindle 28 and thereby the collet 29.

By appropriate selection of the lever arms of levers 22 and 25, the desired displacement of the collet into and out of operative position may be effected by a relatively short stroke of the piston in cylinder 17. Furthermore, the piston in cylinder 17 may be operated by a relatively light pressure as the only work it has to do is to actuate the levers to move the collet into and out of its operative position, the back pressure developed on the collet 29 not being transmitted to said piston, but being sustained by said levers 22 and 25 and bumper member 26 when the latter has engaged lever 22 following passage of pivot 24 past its dead center position. Because of the short stroke and relatively low pressure required in the cylinder 17 the speed of movement of the collet into and out of operative position may be greatly increased over that obtainable where the collet is directly connected to the piston of a hydraulic device and the piston not only has to move through the same length of stroke as the collet but also under a pressure adequate to overcome the back pressure developed on the collet so that a size and strength of parts commensurate with the greater pressure is required. Thereby the present invention provides a collet operating mechanism which may operate at a relatively high speed, materially cutting down on the intervals of time during which the collet is moving into and out of its operative position, while the collet operating mechanism may be smaller, lighter, and therefore less expensive, than collet operating mechanisms heretofore in use.

While the embodiment of the invention illustrated on the drawing has been described with considerable particularity it is to be expressly understood that the invention is not limited thereto as the same may receive a variety of mechanical expressions, as will now be apparent to those skilled in the art, while changes may be made in the details of construction, sizes, arrangements, proportion of parts, etc., and parts may be replaced by equivalent parts, without departing from the present invention. Other arrangements of the fluid pressure device with respect to the toggles for opening and closing the same may also be employed. Reference is therefore to be had to the claims appended hereto for a definition of the invention.

What is claimed is:

1. In a machine for hydraulically forming bellows having a rectilinearly movable collet engaging the tube to be corrugated and a hydraulically actuated piston for moving the collet, means for connecting said collet to said piston, said means comprising a spindle to which said collet is secured, a link pivoted to said spindle, a second link pivoted at one end to said first named link and movable in one direction into the path of rotation thereof, said second link being pivoted medially to the machine, and a piston rod connected to said piston and pivotally connected to the other end of said second named link for rotating said links into mutual operative engagement sufficient for limiting further rotation thereof in said direction.

2. In a machine for hydraulically forming bellows having a rectilinearly movable collet engaging the tube to be corrugated and a hydraulically actuated piston for moving the collet, means for connecting said collet to said piston, said means comprising a spindle to which said collet is secured, a link pivoted to said spindle, a second link pivoted at one end to said first named link and pivoted medially to the machine, a piston rod connected to said piston and pivotally connected to the other end of said second named link, and a stop carried by said first named link for engagement with said second named link to revent rotation of said links in one direction when said collet is moved to tube engaging position.

3. In a machine for hydraulically forming bellows having a rectilinearly movable collet engaging the tube to be corrugated and a hydraulically actuated piston for moving the collet, means for connecting said collet to said piston, said means comprising a spindle to which said collet is secured, a link pivoted to said spindle, a second link pivoted at one end to said first named link and movable in one direction into the path of rotation thereof, said second link being pivoted medially to the machine and a piston rod connected to said piston and pivotally connected to the other end of said second named link for rotating said links into mutual operative engagement sufficient for limiting further rotation thereof in said direction, said pivot of said second named link to the machine falling in the line of the axis of said spindle and of said pivot of said link to said spindle.

4. In a machine for hydraulically forming bellows having a rectilinearly movable collet engaging the tube to be corrugated and hydraulically actuated piston for moving the collet, means for connecting said collet to said piston, said means comprising a spindle to which said collet is secured, a link pivoted to said spindle, a second link pivoted at one end to said first named link and pivoted medially to the machine, a piston rod connected to said piston and pivotally connected to the other end of said second named link, and a stop carried by said first named link for engagement with said second named link to prevent rotation of said links in one direction when said collet is moved to tube engaging position, said pivot of said second named link to the machine falling in the line of the axis of said spindle and of said pivot of said link to said spindle, said pivot between said links falling below said line when said stop engages said second named link.

5. In a machine for hydraulically forming bellows having a rectilinearly movable collet engaging the tube to be corrugated and a hydraulically actuated piston for moving the collet, means for connecting said collet to said piston, said means comprising a spindle to which said collet is secured, a link pivoted to said spindle, a bell crank pivoted at one end to said first named link and pivoted medially to the machine, a piston rod connected to said piston and pivotally connected to the other end of said bell crank, a stop carried by said first named link for engagement with said bell crank to prevent rotation in one direction of said link and of said bell crank when said collet is moved to tube engaging position, the pivot of said bell crank to the machine falling in the line of the axis of the spindle and the pivot between said link and said bell crank falling below the line of axis of said spindle when said stop engages said bell crank.

PAUL E. CATE.

REFERENCES CITED

The following references are of record in the file of this patent:

UNITED STATES PATENTS

| Number | Name | Date |
|---|---|---|
| 558,518 | Potter | Apr. 21, 1896 |
| 885,166 | Mason | Apr. 21, 1908 |
| 1,689,620 | Clifford | Oct. 30, 1928 |
| 1,951,381 | Ward | Mar. 20, 1934 |
| 2,121,119 | Griley | June 21, 1938 |
| 2,165,985 | Schwentler | July 11, 1939 |
| 2,189,992 | Pearce | Feb. 13, 1940 |
| 2,217,799 | Giesler | Oct. 15, 1940 |
| 2,224,968 | Klocke | Dec. 17, 1940 |
| 2,310,556 | Strong | Feb. 9, 1943 |
| 2,421,153 | Kinne | May 27, 1947 |
| 2,451,844 | Lornitzo | Oct. 19, 1948 |